(12) United States Patent
Kovacs et al.

(10) Patent No.: US 12,516,701 B2
(45) Date of Patent: Jan. 6, 2026

(54) EXTERNALLY MOUNTABLE CONDUCTIVE ASSEMBLY WITH CIRCULAR BASE PLATE

(71) Applicant: AKTIEBOLAGET SKF, Gothenburg (SE)

(72) Inventors: Gene A Kovacs, Brighton, MI (US); Mathieu Hubert, Ann Arbor, MI (US)

(73) Assignee: AKTIEBOLAGET SKF, Gothenburg (SE)

( * ) Notice: Subject to any disclaimer, the term of this patent is extended or adjusted under 35 U.S.C. 154(b) by 208 days.

(21) Appl. No.: 18/230,001

(22) Filed: Aug. 3, 2023

(65) Prior Publication Data

US 2025/0043828 A1 Feb. 6, 2025

(51) Int. Cl.
| | | |
|---|---|---|
| *F16C 41/00* | (2006.01) | |
| *F16C 19/52* | (2006.01) | |
| *F16C 33/38* | (2006.01) | |
| *F16C 33/58* | (2006.01) | |

(52) U.S. Cl.
CPC ............ *F16C 41/002* (2013.01); *F16C 19/52* (2013.01); *F16C 33/38* (2013.01); *F16C 33/586* (2013.01); *F16C 41/004* (2013.01); *F16C 2202/32* (2013.01); *F16C 2380/26* (2013.01)

(58) Field of Classification Search
CPC ........ F16C 41/002; F16C 19/52; F16C 33/38; F16C 33/586; F16C 41/004; F16C 2202/32; F16C 2380/26; F16C 19/06; F16C 33/30; H02K 11/0094; H02K 11/40; H01R 13/02; H01R 39/18
USPC ....................................... 361/221
See application file for complete search history.

(56) References Cited

U.S. PATENT DOCUMENTS

| | | | |
|---|---|---|---|
| 3,757,164 | A | 9/1973 | Binkowski |
| 5,069,415 | A * | 12/1991 | Mechalas ................. H02K 5/26 248/674 |
| 5,812,908 | A | 9/1998 | LaRocca et al. |
| 8,169,766 | B2 | 5/2012 | Oh et al. |
| 9,464,672 | B2 | 10/2016 | White |
| 10,253,818 | B1 | 4/2019 | Ince et al. |
| 11,309,775 | B2 | 4/2022 | Hubert et al. |

(Continued)

OTHER PUBLICATIONS

Unpublished U.S. Appl. No. 17/841,978, Gene A Kovacs, filed Jun. 16, 2022.

*Primary Examiner* — Sreeya Sreevatsa
(74) *Attorney, Agent, or Firm* — J-TEK LAW PLLC; Scott T. Wakeman; Mark A. Ussai

(57) ABSTRACT

An electrically conductive assembly prevents current flow through the raceways of a bearing rotatably coupling a shaft with an outer member, such that the shaft or outer member is rotatable about a central axis, the outer member having an exterior mounting surface spaced radially outwardly from the bore. The conductive assembly includes an annular base plate formed of a conductive material and having a main body entirely encircling the centerline and two or more integral mounting lugs extending radially outwardly from the main body and connectable with the mounting surface of the outer member to secure the conductive assembly to the outer member. An annular inner conductor is connected with the base plate and has an inner radial end engageable with the shaft such that an electrically conductive path extends between the shaft and the outer member through the inner conductor and the base plate.

16 Claims, 10 Drawing Sheets

(56) References Cited

U.S. PATENT DOCUMENTS

| | | | |
|---|---|---|---|
| 2007/0159763 A1* | 7/2007 | Barnard | H02K 11/40 |
| | | | 361/212 |
| 2010/0187946 A1* | 7/2010 | Orlowski | H02K 11/40 |
| | | | 310/232 |
| 2015/0229085 A1* | 8/2015 | Hoehle | H02K 11/40 |
| | | | 439/27 |
| 2019/0296617 A1* | 9/2019 | Hubert | H01R 39/64 |
| 2021/0293279 A1 | 9/2021 | Hubert et al. | |
| 2021/0310518 A1 | 10/2021 | Berruet et al. | |
| 2021/0310520 A1 | 10/2021 | Arnault et al. | |
| 2021/0364040 A1 | 11/2021 | Arnault et al. | |
| 2021/0364041 A1 | 11/2021 | Berruet et al. | |

* cited by examiner

EXTERNALLY MOUNTABLE CONDUCTIVE ASSEMBLY WITH CIRCULAR BASE PLATE

BACKGROUND OF THE INVENTION

The present invention relates to bearings, and more particularly to grounding devices for preventing electric current or charge from passing through a bearing.

Bearings used in electrical machinery, such as motors, generators and similar devices, may be damaged if electric current or charge passes through the bearing, which is particularly harmful to the bearing raceways. Devices such as grounding brushes have been developed to provide an alternative path for current resulting from charge accumulating on a shaft, and thereby prevent such current from passing through the bearing. These devices often include an annular retainer with an outer rim frictionally engaged with the bore of a housing or hub at a position adjacent to the bearing and a plurality of conductive fibers attached to the retainer and spaced circumferentially about the entire outer surface of the shaft to form a relatively solid ring of fibers. As such, current passes from the shaft through the fibers and the retainer and into the housing.

However, a certain amount of axial space is required to install the conductive assembly within the housing bore, particularly since the conductive assembly should be spaced from the bearing by at least a certain distance to avoid any conductive fibers that are detached during use from entering into and damaging the bearing. This space requirement reduces the axial compactness of the shaft and housing/hub. Also, heat generated within the electrical machine may cause differences in thermal expansion of the bearing, bore and/or conductive assembly. As such, the retainer rim may disengage from the bore allowing the conductive assembly to axially displace or create increased radial interference between the conductive fibers and the shaft, leading to substantially increased friction.

SUMMARY OF THE INVENTION

In one aspect, the present invention is electrically conductive assembly for preventing current flow through the raceways of a bearing, the bearing having an inner ring disposed about a shaft and an outer ring disposed within a bore of an outer member, the shaft or the outer member being rotatable about a central axis through the shaft and the outer member having a radial surface spaced radially outwardly from the shaft. The conductive assembly comprises an annular base plate formed of a conductive material, having a centerline and including a main body entirely encircling the centerline and at least two integral mounting lugs extending radially outwardly from the main body. The at least two mounting lugs are connectable with the radial surface of the outer member to secure the conductive assembly to the outer member at a position spaced axially from the bearing. An annular inner conductor is connected with the base plate and has an inner radial end engageable with the shaft such that an electrically conductive path extends between the shaft and the outer member through the inner conductor and the base plate. Preferably, the inner conductor includes an annular conductive retainer disposed against and connected with the base plate, the conductive retainer having an outer radial end, an inner radial end and an annular channel extending radially outwardly from the inner radial end, and a plurality of conductive fibers spaced circumferentially about the centerline, each fiber having an outer radial end disposed within the channel of the retainer and at least one inner radial end engageable with the shaft such that an electrically conductive path extends between the shaft and the outer member through the inner conductor and the base plate.

In another aspect, the present invention is a mechanical assembly including a shaft having a central axis, an outer member having a bore, the shaft being disposed within the bore, and a radial surface spaced radially outwardly from the shaft, a bearing having an inner ring disposed about the shaft and an outer ring disposed within the outer member bore, the bearing rotatably coupling the shaft with the bore such that the shaft or the bore is rotatable about the central axis, and an electrically conductive assembly as described in the preceding paragraph.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are drawn to scale, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 1:
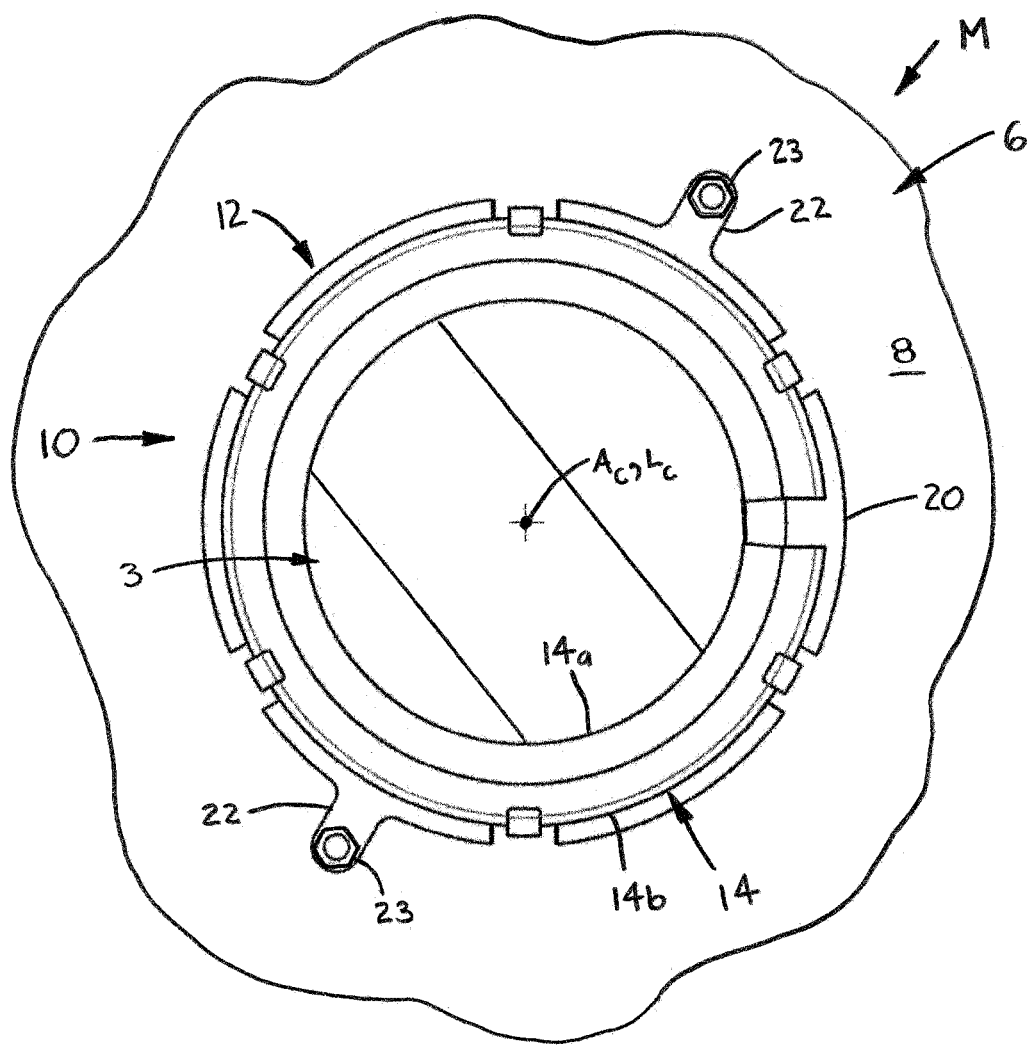
FIG. 1 is broken-away, front plan view of a conductor assembly in accordance with the present invention, shown disposed about a shaft and mounted to an outer member.
Figure 2:
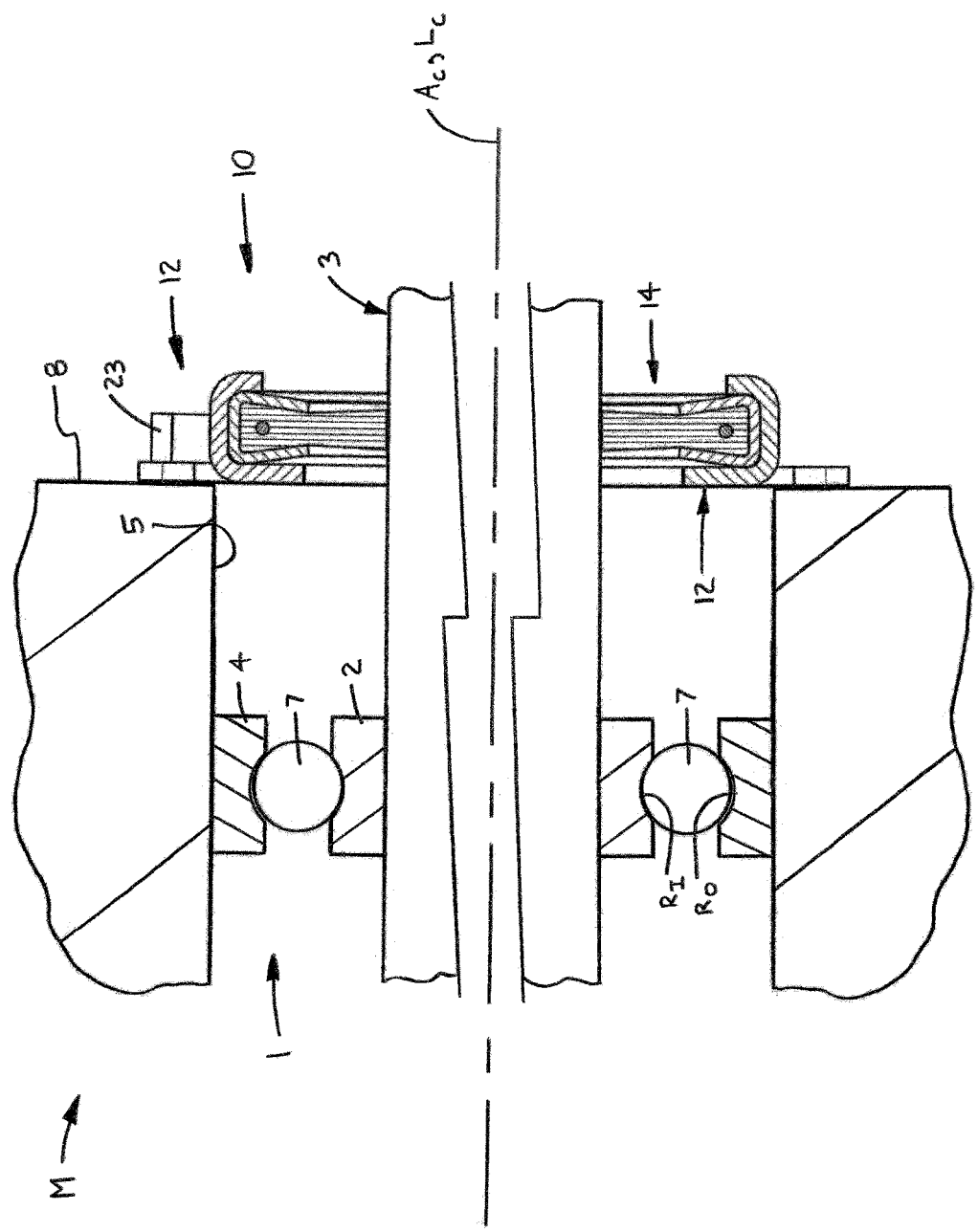
FIG. 2 is a broken-away, axial cross-sectional view of the conductor assembly, shown disposed about shaft, mounted to an outer member and spaced from a bearing.

Referring now to the drawings in detail, wherein like numbers are used to indicate like elements throughout, there is shown in FIGS. 1-11 an electrically conductive assembly 10 for preventing current flow through the raceways RI, Ro of a bearing 1. The bearing 1 has an inner ring 2 disposed about a shaft 3, an outer ring 4 disposed within a bore 5 of an outer member 6, and a plurality of rolling elements 7 (FIG. 2). The rolling elements 7 each roll simultaneously upon the raceways RI, Ro to rotatably couple the bearing rings 2, 4. Thereby, the bearing 1 rotatably couples the shaft 3 and the outer member 6 such that the shaft 3 or the outer member 6 is rotatable about a central axis $A_C$ through the shaft 3. Further, the outer member 6 may be a housing, an axle, a hub, etc. and has an exterior mounting surface 8, which is preferably radial, spaced radially outwardly from the bore 5. The bearing 1, the shaft 3 and the outer member 6 are all components of a motor or other electrical machine M (e.g., a generator) or any other machine having rotatable components likely to accumulate electric charge or convey electric current. In any case, the conductive assembly 10 basically comprises a conductive annular base plate 12 connected with the outer member 6 and an inner annular conductor 14 connected with the base plate 12 and engageable with the shaft 3. As such, the conductive assembly 10 provides an electrically conductive path or paths extending between the shaft 3 and the outer member 6, through the inner conductor 14 and the base plate 12, so as to divert electric charge or current from flowing through the raceways RI, Ro and thereby prevents damage to both the raceways RI, Ro and the rolling elements 7.

More specifically, the annular base plate 12 is formed of a conductive material, preferably a conductive metallic material, most preferably steel, but may be formed of another metallic material such as aluminum or copper, a conductive polymer, from graphite, etc. The base plate 12 has a centerline $L_C$ and includes a generally circular main body 20 entirely encircling the centerline $L_C$ and at least two integral mounting lugs 22 extending radially outwardly from the main body 20. Each mounting tab 22 is connectable with the radial mounting surface 8 of the outer member 6 to secure the conductive assembly 10 to the outer member 6 at a position spaced axially from the bearing 1. Further, the inner conductor 14 has an outer radial end 14b connected with the base plate 12 and an inner radial end 14a engageable with the outer surface 3a of the shaft 3. Preferably, as described in detail below, the conductor 14 is formed as a conductive "brush assembly" 38 including a plurality of circumferentially spaced conductive fibers 42 extending inwardly from substantially the entire perimeter of the inner radial end 14a of the conductor 14.

By having a base plate 12 and connected conductor 14 that each encircles the centerline $L_C$, and thereby the shaft 3, the conductor 14 engages about almost the entire perimeter of the shaft 3. As such, the conductor 14 provides conductive paths for accumulated charge on the shaft 3 that are more effectively distributed about the entire shaft perimeter and essentially functions as a barrier against entry of foreign matter into the bore 5 of the outer member 6. Also, by connecting the base plate 12 is with the exterior, radial surface 8 of the outer member 6, the conductive assembly 10 avoids thermal expansion issues of known conductive assemblies having an annular rim coupled with the inner surface of a bore. Specifically, thermal expansion either causes the rim to separate from the bore, allowing the conductive assembly to axially displace, or results in compressing the inner end of a conductor against the shaft with increased friction. Further, by eliminating an amount of bore space required for installation of the conductive assembly 10, the axial length of the shaft 3 and the housing 6 may be reduced, thereby increasing the axial compactness of the particular machine M. Having described the basic components and functions above, these and other elements of the conductive assembly of the present invention are described in greater detail below.

Figure 4:
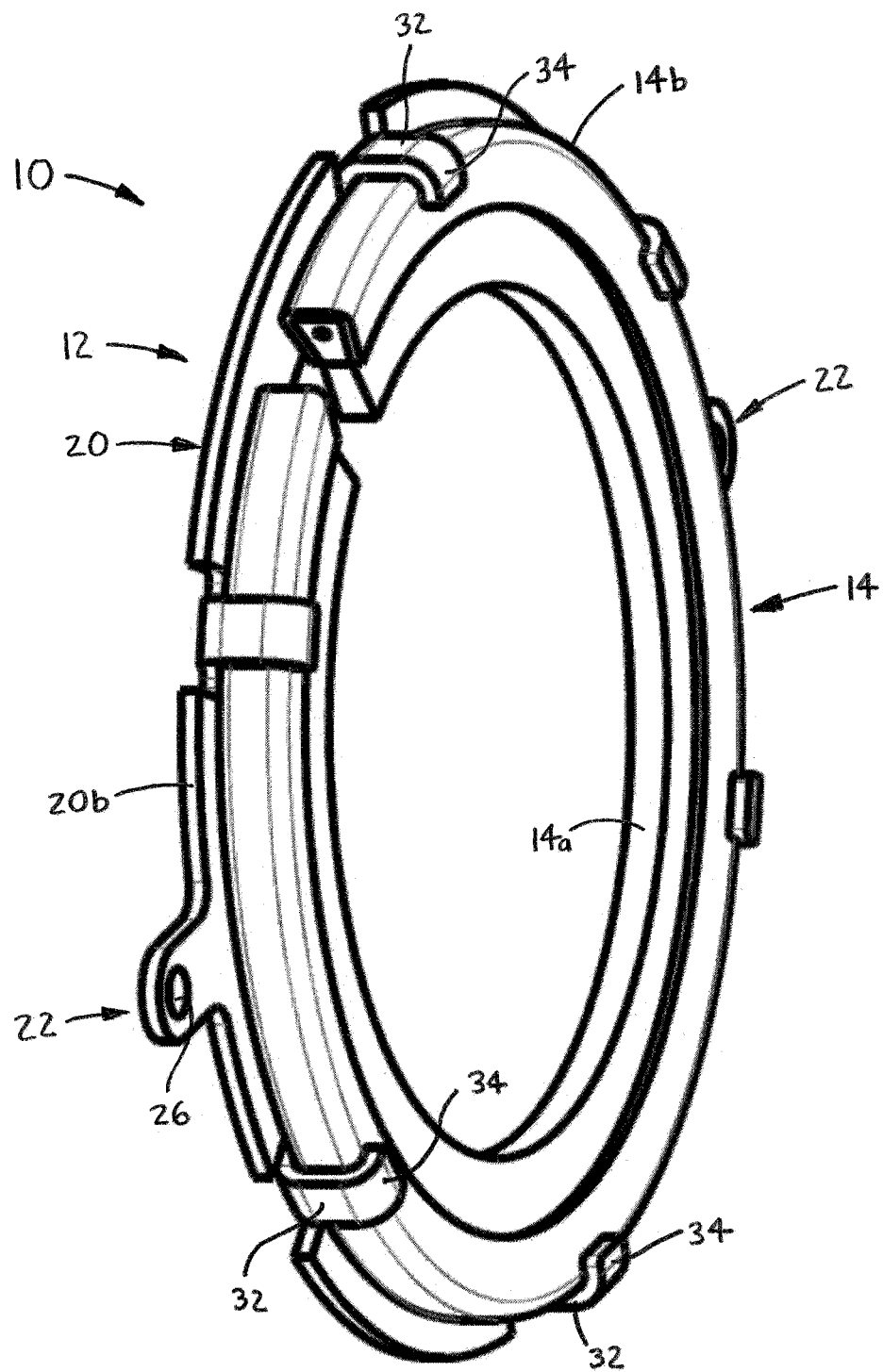
FIG. 4 is a front perspective view of the conductor assembly.
Figure 5:
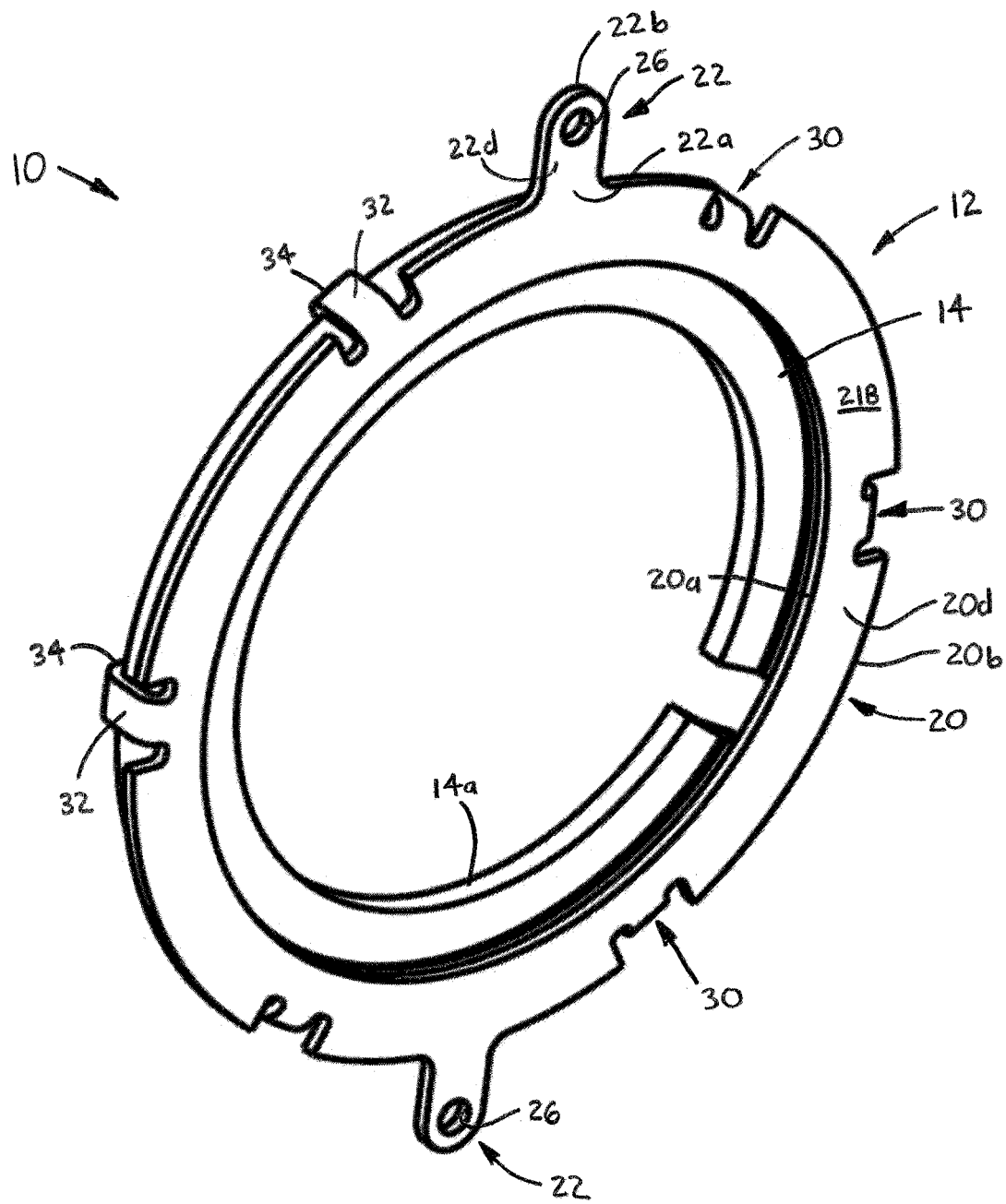
FIG. 5 is a rear perspective view of the conductor assembly.
Figure 6:
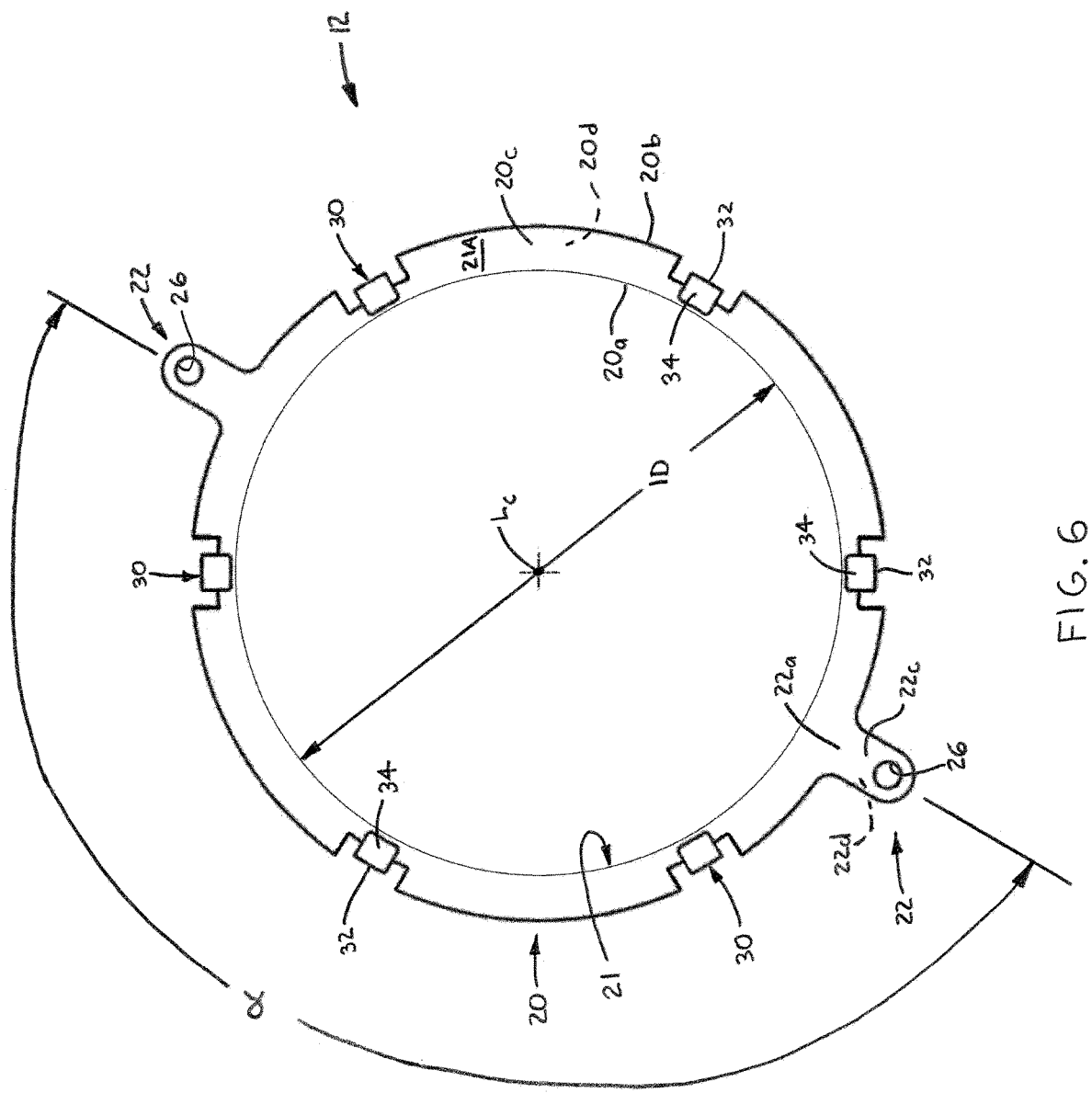
FIG. 6 is a front plan view of a base plate of the conductor assembly.

Referring to FIGS. 4-6, the plate main body 20 is generally circular and has an inner radial end 20a with an inside diameter ID and defining a central opening 21 sized to receive the shaft 3 with clearance and an opposing outer radial end 20b. The main body 20 further has a first axial end 20c with a flat, continuous radial surface 21A and an opposing, second axial end 20b with a flat, continuous radial surface 21B, an axial thickness ta (FIG. 8) being defined between the two axial ends 20c, 20d. Each mounting lug 22 has an inner radial 22a integral with the outer radial end 20b of the main body 20, an outer radial end 22b spaced radially outwardly from the inner end 22a, a first axial end 22c and a second axial end 22d. Further, each mounting lug 22 is preferably generally rectangular with a curved outer end 22b, but may have any other appropriate shape.

Figure 9:
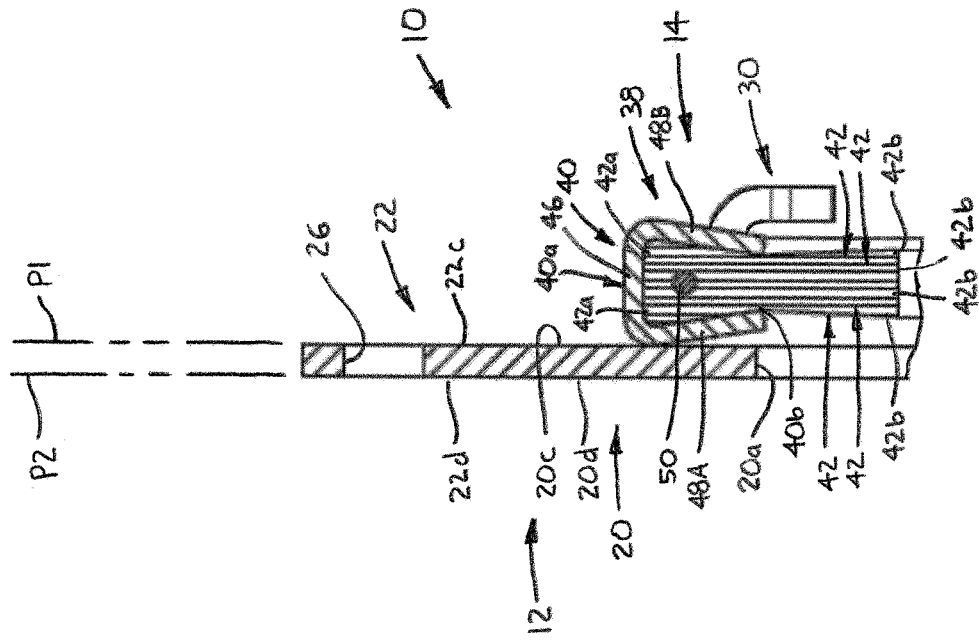
FIG. 9 is an enlarged view through line 9-9 of FIG. 3.

Preferably, the base plate 12 is substantially thin and flat (with the exception of mounting tabs 30 described below) and is preferably formed from a flat, relatively thin metallic blank in a stamping operation. As indicated in FIG. 9, the first axial end 20c of the main body 20 and the first axial end 22c of each mounting lug 22 is disposed within a first radial plane P1 and the second axial end 20b of the main body and the second axial end of each mounting lug 22 is disposed within a second radial plane parallel with the first radial plane P1, thus demonstrating the flatness of the plate 12. Further, the plate 12 has an axial thickness ta that is substantially less than the axial thickness (not indicated) of the conductive brush assembly 38. Although such a thin, flat plate is presently preferred, the base plate 12 may be formed with a substantially greater thickness and/or the mounting lugs 22 may extend both radially outwardly and axially with respect to the main body 20, and thus not disposed in a common plane(s) with the main body 20.

Figure 3:
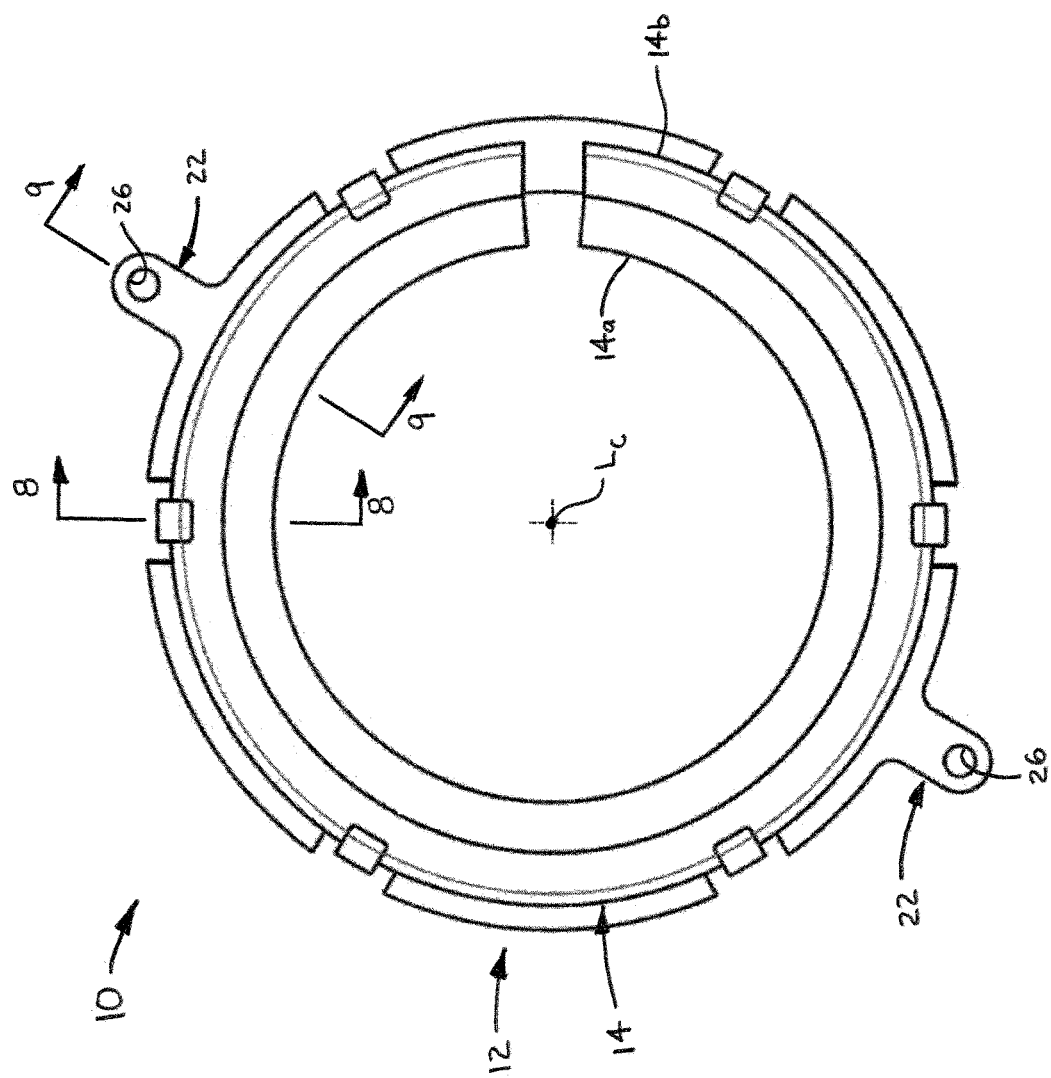
FIG. 3 is a front plan view of the conductor assembly.
Figure 10:
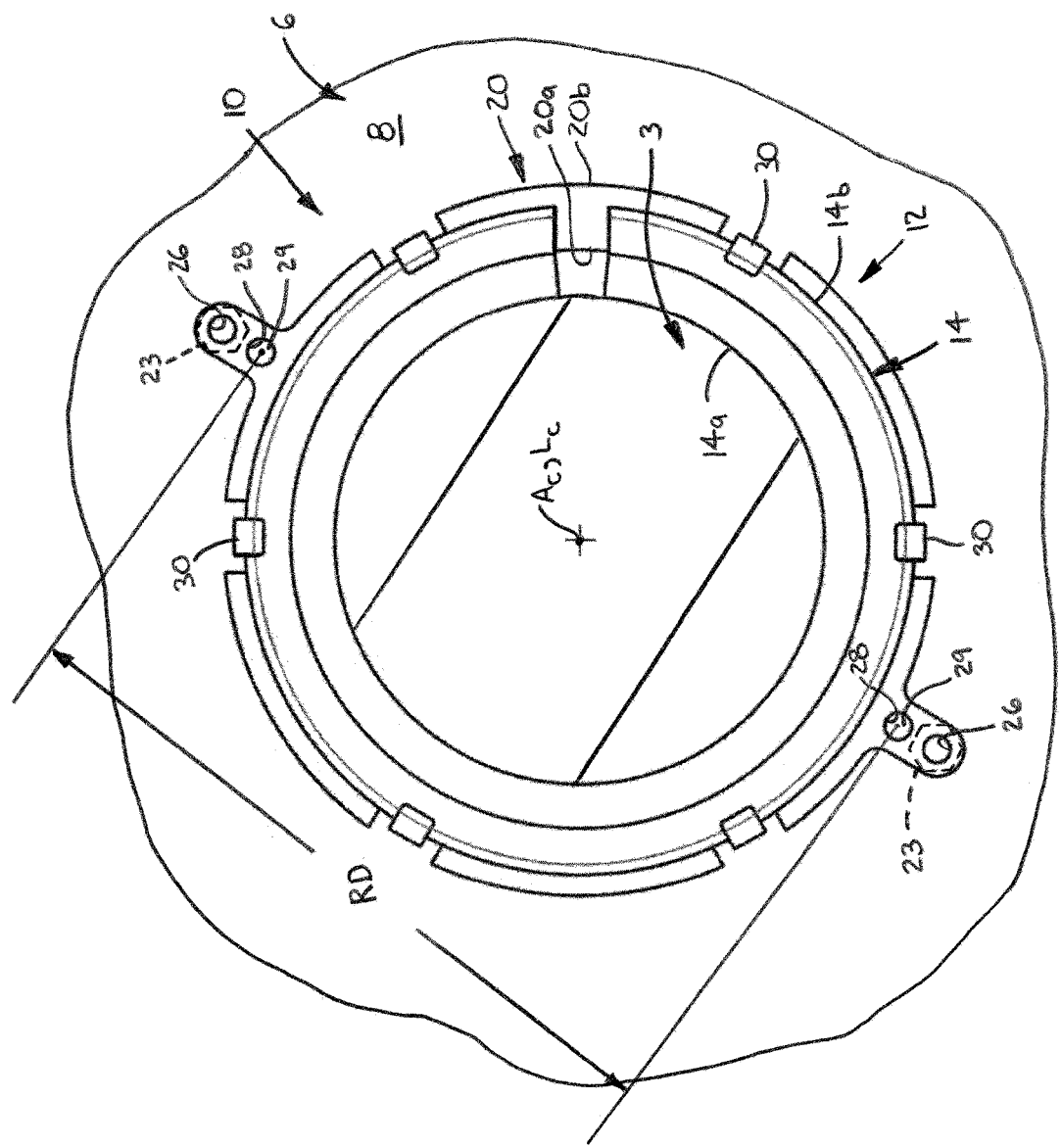
FIG. 10 is broken-away, front plan view of a conductor assembly having an alternative construction baseplate including locator openings, the conductive assembly being shown disposed about a shaft and mounted to an outer member.
Figure 11:
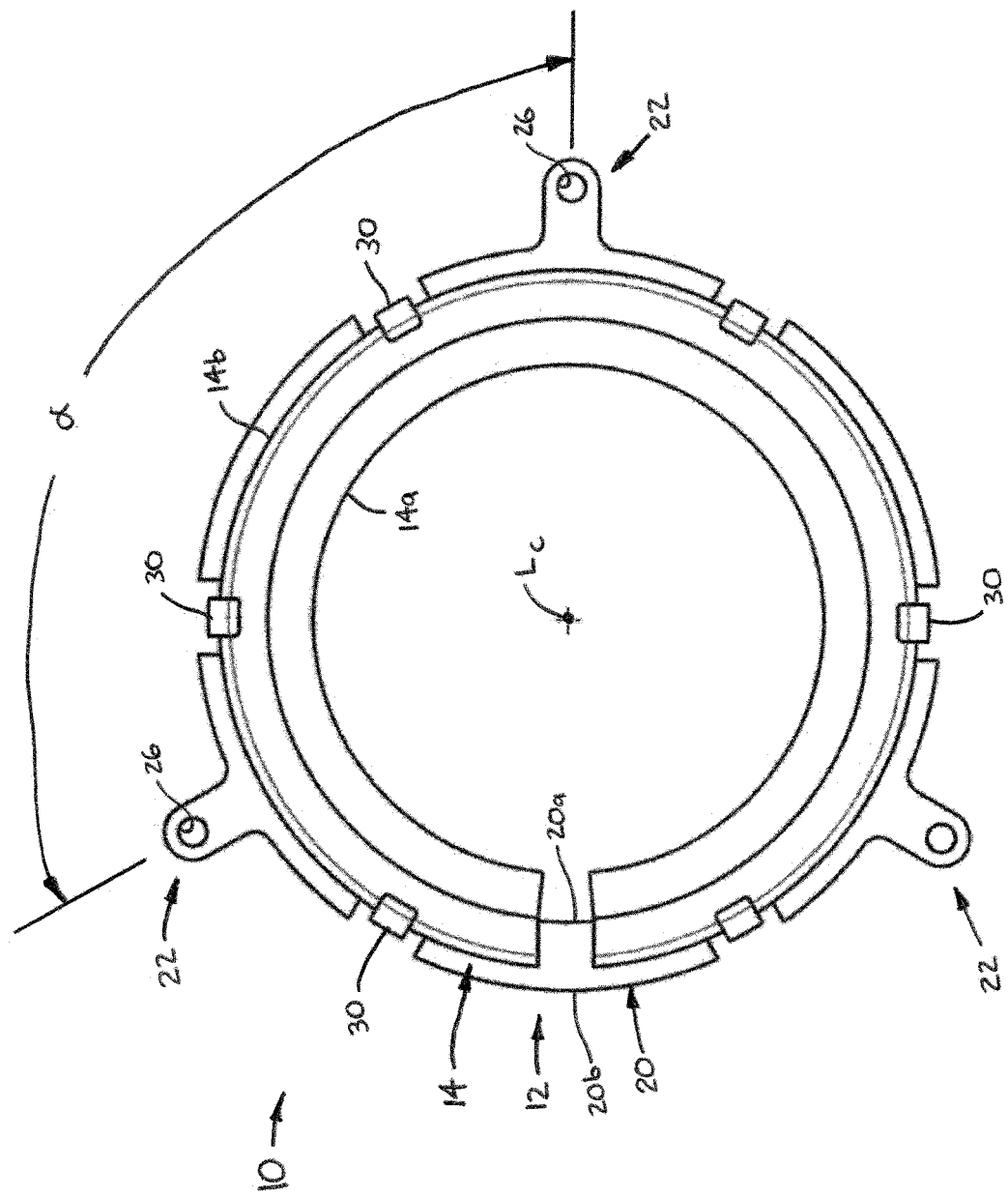
FIG. 11 is a front plan view of an another alternative construction of the base plate including three mounting lugs.

Referring to FIGS. 3, 6 and 10, in a first construction, the base plate 12 includes two mounting lugs 22 spaced circumferentially apart by an angle α, which preferably has a value of about one hundred eighty degrees (180°) but may include a value of between ninety degrees (90°) and one hundred eighty degrees (180°) and, although not presently preferred, may even have a value of less than ninety degrees. In a second construction shown in FIG. 11, the base plate 12 includes three mounting lugs 22 which are preferably evenly spaced apart, and thus circumferentially separated by an angle (not indicated) of about one hundred twenty degrees (120°). However, the base plate 12 may include only a single, substantially larger mounting lug 22, which may extend about the entire, or a substantial portion, of the perimeter of the main body 20, or may include four or more mounting lugs 22 (neither structure shown).

Furthermore, each one of the mounting lugs 22 preferably includes a fastener opening 26 for receiving a fastener 23 (FIGS. 1 and 10), each fastener 23 being engageable with the outer member 6 to connect the base plate 12 therewith. Preferably, each fastener 23 is threadably engaged with a threaded opening (not shown) extending inwardly from the exterior, radial mounting surface 8. However, the mounting lugs 22 may be attached to the exterior surface 8 by any other appropriate means, such as for example, by separate clamping members attached to the outer member 6, by frictionally engaging an axial portion of the mounting lugs 22 with a circumferential or axially transverse mounting surface 8, etc. (no alternatives shown).

In certain applications, each mounting lug 22 also includes a locator opening 28 for receiving a locator pin 29 engageable with the outer member 6, as shown in FIG. 10. Each locator opening 28 is positioned at a predetermined radial distance RD from the centerline $L_C$ such that a desired concentricity of the inner conductor 12 is established when at least two locator pins 29 are each inserted within a separate one of the two locator openings 28 and engaged with the outer member 6, preferably with a precisely positioned locator openings (not shown) extending inwardly from the mounting surface 8. Further, each locator opening 28 is configured to receive one locator pin 29 with a locational interference fit and each fastener opening 26 is configured to receive one fastener 23 with a locational clearance fit (or even a "looser" fit).

Referring to FIGS. 4-6, 8 and 9, the base plate 12 preferably has a plurality of integral mounting tabs 30 each extending axially from the main body 20 and spaced circumferentially about the centerline $L_C$. Each mounting tab 30 is engaged with the inner conductor 14 to connect the conductor 14 with the base plate 12. More specifically, each mounting tab 30 has an axial portion 32 extending from the outer radial end 20a of the annular plate 20 and a radial portion 34 spaced axially from the annular plate 20 and extending inwardly from the axial portion 25. As such, the conductor 14 is axially sandwiched between the annular plate 20 and the radial portion 34 of each tab 24. With the preferred base plate 12 being formed by stamping a flat blank, each mounting tab 30 initially extends radially outwardly from the main body 20 and is bent twice to encircle the outer radial end 14b of the conductor 14. However, the base plate 12 or the conductive assembly 10 may alternatively be formed to attach the inner conductor 14 to the base plate 12 by any other appropriate means, such as for example, by separate clip members which attach the conductor 14 to the plate main body 20, by fasteners that extend through the conductor 14 and the base plate 12, etc.

Figure 7:
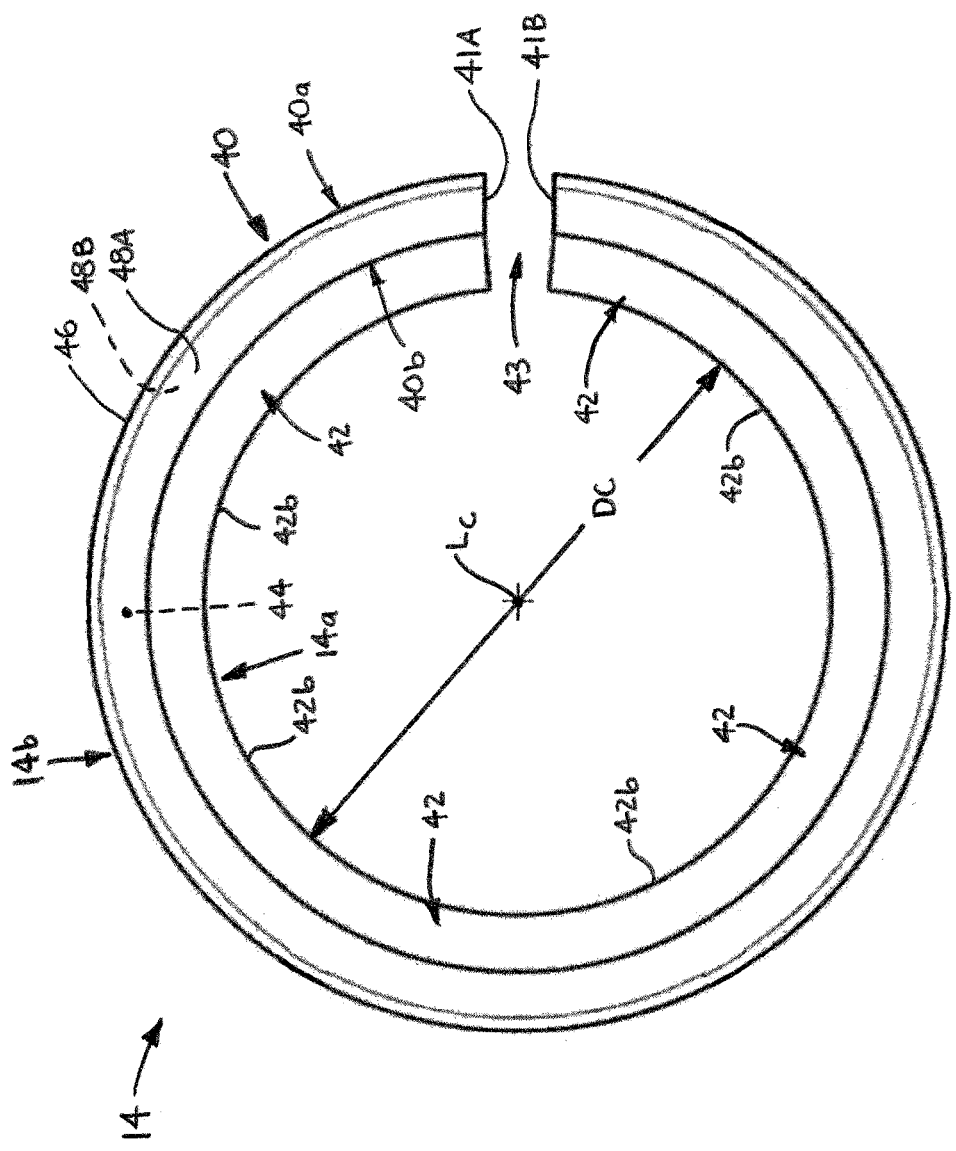
FIG. 7 is a front plan view of a conductor of the conductor assembly.
Figure 8:
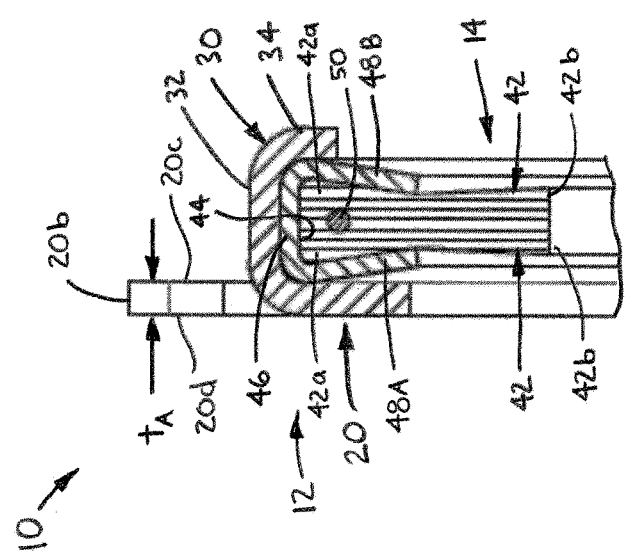
FIG. 8 is an enlarged view through line 8-8 of FIG. 3.

Referring now to FIGS. 7-9, the conductor 14 is preferably a conductive brush assembly 38 including an outer, annular conductive retainer 40 and a plurality of conductive fibers 42 extending radially inwardly from the annular retainer 40 and configured to engage with the shaft 3. Preferably, the fibers 42 engage with an interference (i.e., by bending of the fibers 22) of up to five millimeters (5 mm) diametrically. Each conductive fiber 22 is preferably formed of carbon, but may alternatively be formed of a metallic material (e.g., copper, aluminum), a conductive polymeric material or any other appropriate material.

Further, the annular conductive retainer 40 has a closed outer radial end 40a providing the conductor outer radial end 14a, an open inner radial end 40b, an annular channel 44 extending radially outwardly from the inner radial end 40b and two circumferential ends 41A, 41B. Preferably, the annular conductive retainer 40 is formed so as to include an outer base wall 46 and a pair of sidewalls 48A, 48B extending radially inwardly from the base wall 46 and defining the circumferential channel 44. Also, the annular retainer 40 is preferably formed of a conductive metallic material, most preferably aluminum, but may be formed of another metallic material such as steel or copper, a conductive polymeric material, or any other electrically conductive material.

Further, the plurality of conductive fibers 42 are spaced circumferentially about the centerline $L_C$ of the conductor 14 and are preferably evenly distributed along the entire arcuate perimeter (not indicated) between the circumferential ends 41A, 41B of the annular retainer 40. Each conductive fiber 42 has an outer radial end 42a disposed within the channel 44 of the retainer 40 and at least one inner radial end 42b engageable with the shaft 3. Preferably, the annular conductor 14 further includes an annular conductive wire 50 disposed within the retainer channel 44. Each conductive fiber 42 is bent about the arcuate wire 50 such that each fiber 42 has two inner radial ends 42b engageable with the shaft 3 and is generally U-shaped or V-shaped. As best shown in FIG. 7, the two circumferential ends 41A, 41B are spaced apart so as to define a gap 43 and the gap 43 is adjustable by relative displacement of the two circumferential ends 41A, 41B to adjust the inside diameter DC of the inner conductor 14, preferably prior to mounting the conductor 14 to the base plate 12. Thereby, a desired inside diameter DC of the conductor 14 may be established to fit the specific size (i.e., outside diameter) of the shaft 3.

Although the conductor 14 preferably includes the annular retainer 40 and the plurality of conductive fibers 42, the conductor 14 may be formed in any other appropriate manner. For example, the conductor 14 may be formed as an arcuate solid member (not shown) formed of a flexible, electrically conductive polymeric material, graphite or another electrically conductive material.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. An electrically conductive assembly for preventing current flow through the raceways of a bearing, the bearing having an inner ring disposed about a shaft and an outer ring disposed within a bore of an outer member, the shaft or the outer member being rotatable about a central axis through the shaft and the outer member having an exterior mounting surface spaced radially outwardly from the bore, the conductive assembly comprising:

an annular base plate formed of a conductive material, having a centerline and including a main body entirely encircling the centerline, the main body having an outer radial end, a first outer axial end and a second outer axial end, and at least two mounting lugs integrally formed with and extending radially outwardly from the outer radial end of the main body and connectable with the mounting surface of the outer member to secure the conductive assembly to the outer member at a position spaced axially from the bearing, each one of the at least two mounting lugs having a first outer axial end and a second outer axial end, the first outer axial end of the main body and the first outer axial end of each mounting lug being disposed within a first radial plane and the second outer axial end of the main body and the second outer axial end of each mounting lug being disposed within a second radial plane; and an annular inner conductor connected with the annular base plate and having an inner radial end engageable with the shaft such that an electrically conductive path extends between the shaft and the outer member through the annular inner conductor and the annular base plate.

2. The electrically conductive assembly as recited in claim 1, wherein each one of the first and second axial ends of the plate main body has a flat radial surface, at least a portion of the annular inner conductor being disposed against the flat radial surface of one of the first and second axial ends.

3. The electrically conductive assembly as recited in claim 1, wherein the at least two mounting lugs are spaced circumferentially apart about the centerline of the annular base plate by an angle, the angle having a value of about one hundred eighty degrees or a value of about one hundred twenty degrees.

4. The electrically conductive assembly as recited in claim 1, wherein the annular base plate has a plurality of mounting tabs integrally formed with and each extending radially from the main body and spaced circumferentially about the centerline, each tab being engaged with the annular inner conductor to connect the annular inner conductor with the annular base plate.

5. The electrically conductive assembly as recited in claim 1, wherein the annular inner conductor includes:

an annular conductive retainer disposed against the annular base plate and having an outer radial end, an inner radial end and an annular channel extending radially outwardly from the inner radial end; and a plurality of conductive fibers spaced circumferentially about the centerline, each fiber having an outer radial end disposed within the annular channel of the annular conductive retainer and at least one inner radial end engageable with the shaft.

6. The electrically conductive assembly as recited in claim 5, wherein:

inner radial ends of all of the plurality of conductive fibers collectively define an inside diameter of the annular inner conductor; and the annular conductive retainer has two spaced apart circumferential ends defining a gap, the gap being adjustable by relative displacement of the two circumferential ends of the annular conductive retainer so as to adjust the inside diameter of the annular inner conductor.

7. The electrically conductive assembly as recited in claim 5, wherein the annular inner conductor further includes an annular wire disposed within the annular channel of the annular conductive retainer and each conductive fiber is bent about the arcuate wire such that each fiber has two inner radial ends engageable with the shaft or the bearing inner ring.

8. The electrically conductive assembly as recited in claim 1, further comprising two fasteners and wherein each one of the at least two mounting lugs includes a fastener opening for receiving a separate one of the two fasteners, each fastener being engageable with the outer member to connect the annular base plate with the outer member.

9. The electrically conductive assembly as recited in claim 8, further comprising two locator pins and wherein each one of the at least two mounting lugs further includes a locator opening for receiving a locator pin engageable with the outer member, each locator opening being positioned at a predetermined radial distance from the centerline such that a desired concentricity of the annular inner conductor is established when the two locator pins are each inserted within a separate one of the two locator openings and engaged with the outer member, each locator opening being configured to receive one locator pin with a locational interference fit and each fastener opening being configured to receive one fastener with a locational clearance fit.

10. An electrically conductive assembly for preventing current flow through the raceways of a bearing, the bearing having an inner ring disposed about a shaft and an outer ring disposed within a bore of an outer member, the shaft or the outer member being rotatable about a central axis through the shaft and the outer member having an exterior mounting surface spaced radially outwardly from the bore, the conductive assembly comprising:

an annular base plate formed of a conductive material, having a centerline and including a main body entirely encircling the centerline, the main body having an outer radial end, a first outer axial end and a second outer axial end, and at least integral mounting lugs integrally formed with and extending radially outwardly from the outer radial end of the main body and connectable with the mounting surface of the outer member to secure the conductive assembly to the outer member at a position spaced axially from the bearing, each one of the at least two mounting lugs having a first outer axial end and a second outer axial end, the first outer axial end of the main body and the first outer axial end of each mounting lug being disposed within a first radial plane and the second outer axial end of the main body and the second outer axial end of each mounting lug being disposed within a second radial plane; and an annular inner conductor including an annular conductive retainer disposed against and connected with the annular base plate, the annular conductive retainer having an outer radial end, an inner radial end and an annular channel extending radially outwardly from the inner radial end, and a plurality of conductive fibers spaced circumferentially about the centerline, each fiber having an outer radial end disposed within the annular channel of the annular conductive retainer and at least one inner radial end engageable with the shaft such that an electrically conductive path extends between the shaft and the outer member through the annular inner conductor and the annular base plate.

11. The electrically conductive assembly as recited in claim 10, wherein:

the inner radial ends of all of the conductive fibers collectively define an inside diameter of the annular inner conductor; and the annular conductive retainer has two spaced apart circumferential ends defining a gap, the gap being adjustable by relative displacement of the two circumferential ends of the annular conductive retainer so as to adjust the inside diameter of the annular inner conductor.

12. The electrically conductive assembly as recited in claim 11, wherein the annular inner conductor further includes an annular wire disposed within the channel of the annular conductive retainer and each conductive fiber is bent about the arcuate wire such that each fiber has two inner radial ends engageable with the shaft or the bearing inner ring.

13. The electrically conductive assembly as recited in claim 10, wherein the at least two mounting lugs are spaced circumferentially apart about the centerline of the annular base plate by an angle, the angle having a value of about one hundred eighty degrees or a value greater than ninety degrees and less than one hundred eighty degrees.

14. The electrically conductive assembly as recited in claim 10, wherein the annular base plate further includes a plurality of integral mounting tabs each extending axially from the main body and spaced circumferentially about the centerline, each tab being engaged with the annular inner conductor to connect the annular inner conductor with the annular base plate.

15. The electrically conductive assembly as recited in claim 10, further comprising two fasteners and two locator pins and wherein each one of the at least two mounting lugs includes a fastener opening for receiving a separate one of the two fasteners, each fastener being engageable with the outer member to connect the base plate with the outer member, and a locator opening for receiving a separate one of the two locator pins, each locator pin being engageable with the outer member, each locator opening being positioned at a predetermined radial distance from the centerline such that a desired concentricity of the annular inner conductor is established when the two locator pins are each inserted within a separate one of the two locator openings and engaged with the outer member, each locator opening being configured to receive one locator pin with a locational interference fit and each fastener opening being configured to receive one fastener with a locational clearance fit.

16. A mechanical assembly comprising:
a shaft having a central axis;
an outer member having a bore, the shaft being disposed within the bore, and an exterior mounting surface spaced radially outwardly from the bore;
a bearing having an inner ring disposed about the shaft and an outer ring disposed within the outer member bore, the bearing rotatably coupling the shaft with the bore such that the shaft or the bore is rotatable about the central axis; and
an electrically conductive assembly for preventing current flow through the bearing and including:
an annular base plate formed of a conductive material, having a centerline and including a main body entirely encircling the centerline, the main body having an outer radial end, and at least two mounting lugs integrally formed with and extending radially outwardly from the outer radial end of the main body and connectable with the mounting surface of the outer member to secure the conductive assembly to the outer member at a position spaced axially from the bearing, each one of the at least two mounting lugs having a first outer axial end and a second outer axial end, the first outer axial end of the main body and the first outer axial end of each mounting lug being disposed within a first radial plane and the second outer axial end of the main body and the second outer axial end of each mounting lug being disposed within a second radial plane; and
an annular inner conductor connected with the annular base plate and having an inner radial end engageable with the shaft such that an electrically conductive path extends between the shaft and the outer member through the annular inner conductor and the annular base plate.

* * * * *